United States Patent
Daeseleire et al.

(10) Patent No.: US 11,484,885 B2
(45) Date of Patent: Nov. 1, 2022

(54) METHOD FOR PRODUCING AQUEOUS DISPERSIONS FOR USE AS A FLAME RETARDANT ADDITIVE TO WOOD COMPOSITE PANELS

(71) Applicant: ECOCHEM INTERNATIONAL, NAAMLOZE VENNOOTSCHAP, Olen (BE)

(72) Inventors: Pieter Daeseleire, Reet (BE); Herman Meynaerts, Rillaar (BE)

(73) Assignee: ECOCHEM INTERNATIONAL NV, Olen (BE)

( * ) Notice: Subject to any disclaimer, the term of this patent is extended or adjusted under 35 U.S.C. 154(b) by 638 days.

(21) Appl. No.: 16/473,704

(22) PCT Filed: Dec. 26, 2017

(86) PCT No.: PCT/EP2017/084590
§ 371 (c)(1),
(2) Date: Jun. 26, 2019

(87) PCT Pub. No.: WO2018/122222
PCT Pub. Date: Jul. 5, 2018

(65) Prior Publication Data
US 2020/0122154 A1   Apr. 23, 2020

(30) Foreign Application Priority Data

Dec. 30, 2016 (BE) .................... 2016/5997
Mar. 17, 2017 (BE) .................... 2017/5167

(51) Int. Cl.
*B02C 17/16* (2006.01)
*C09K 21/04* (2006.01)
*B01J 8/00* (2006.01)

(52) U.S. Cl.
CPC .............. *B02C 17/163* (2013.01); *B01J 8/00* (2013.01); *B01J 8/002* (2013.01); *B01J 8/005* (2013.01); *B01J 8/0015* (2013.01); *C09K 21/04* (2013.01)

(58) Field of Classification Search
CPC  B02C 17/163; C09K 21/04; B01J 8/00; B01J 8/0015; B01J 8/005; B01J 8/002
See application file for complete search history.

(56) References Cited

U.S. PATENT DOCUMENTS

| 5,948,323 A | 9/1999 | McLaughlin et al. |
| 7,959,895 B2 * | 6/2011 | Herbiet .................. C01F 7/144 423/625 |

FOREIGN PATENT DOCUMENTS

| EP | 2586849 A2 | 5/2013 |
| WO | 2007096883 A2 | 8/2007 |

* cited by examiner

*Primary Examiner* — Cephia D Toomer
(74) *Attorney, Agent, or Firm* — Hodgson Russ LLP

(57) ABSTRACT

The current invention concerns a method for producing an aqueous dispersion suitable for being used as a flame retardant additive to wood composite panels. At least one pH-regulator, at least one inorganic thickener, and optionally at least one smoke suppressing agent is added to a premix while maintaining the actuation of wet-milling systems until the dispersion is obtained.

13 Claims, 1 Drawing Sheet

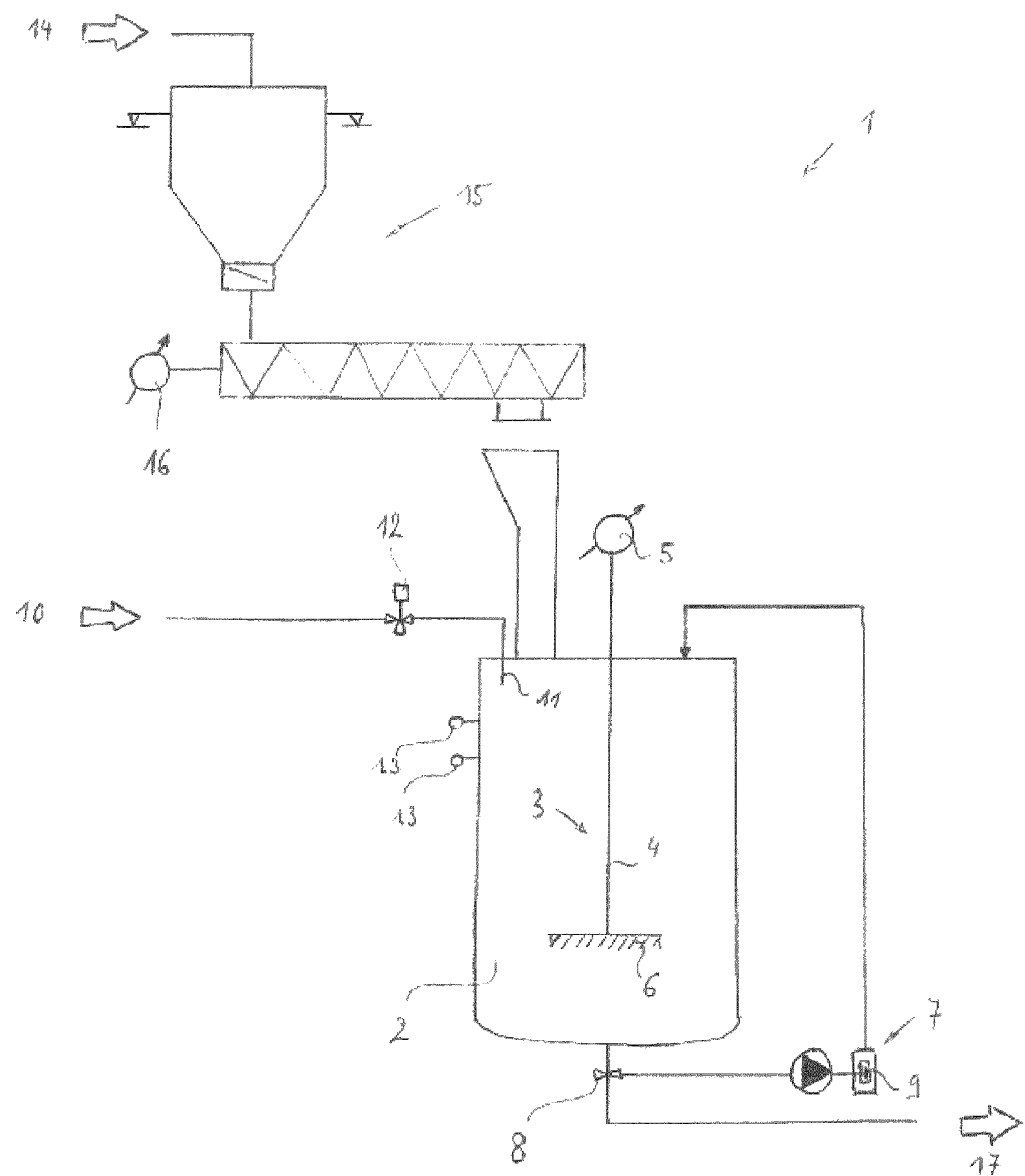

METHOD FOR PRODUCING AQUEOUS DISPERSIONS FOR USE AS A FLAME RETARDANT ADDITIVE TO WOOD COMPOSITE PANELS

TECHNICAL FIELD

The invention pertains to the technical field of methods for producing aqueous dispersions for use as a flame retardant additive to wood composite panels.

BACKGROUND

Wood composite panels are widely used in the construction business. Both wood as well as these wood-base materials have to meet extensive requirements with regard to flameproof properties. In Europe, various standards and requirements are introduced which allow comparison of fire properties of construction materials (e.g. Euroclasses). Characteristics such as non-combustibility, ignitability, flame spread, calorific value as well as the development of smoke and burning droplets of the material are all taken into account when classifying a construction material in these classes.

In order to meet these requirements and to meet the highest quality standards, wood composite panels are during their production often supplemented with compositions with fire retarding characteristics and optionally smoke suppressors.

These compositions are often added as a dispersion during the production if those panels. However, flame retardant additives are known to have poor dispersion stability; a relatively fast agglomeration of particles may result in sedimentation, causing problems to both storage of the dispersion and to transport of the dispersion through pipes. This poor dispersion stability thus imposes that the dispersion be produced on-site, requiring of the panel manufacturers a strict work planning and further requiring each of them to provide for own equipment for producing such dispersions themselves.

EP 2 586 849 A2 discloses an aqueous dispersion comprising a flame retardant, a method for producing said dispersion and the use of said dispersion as a flame retardant additive to products having flame retardant properties. Said products include wood composite panels.

However, there continuously remains a need in the art for flame retardant dispersions having ever increasing stabilities. Ultimately, this would render it possible to produce said ready-to-use dispersions at a central location, and subsequently transporting them to the individual composite wood panel manufacturers. Even higher dispersion stabilities would allow these manufacturers to maintain a temporary stock of the dispersion, enabling for a more streamlined manufacturing process that is less susceptible to external factors. Ideally, a method should be engineered, enabling the production of such stable dispersions, having a stability of at least two days or more.

Furthermore, EP 2 586 849 A2 mentions that the incorporation of flame retardant tends to decrease certain mechanical properties of wood composite panels. EP 2 586 849 A2 therefore expresses the need in the art for a form of dispersion that decreases this tendency. A rather straightforward solution, proposed by EP 2 586 849 A2, is to reduce the content of the flame retardant in the panels, thereby making a trade-off which results in improved flame retardant properties, with only a moderate deterioration of the mechanical properties.

The present invention relates to aqueous dispersions, suitable for being used as flame retardant additives to wood composite panels. There is a need in the art for a method for producing such dispersions, whereby the stability of said dispersions is at least two days. Furthermore, there is a need in the art for a method for producing such dispersions, whereby their composition is such that, upon incorporation into composite wood panels, the flame retardant agent affects the mechanical properties of the wood panels to a lesser degree, or even not at all. The present invention aims to provide a method for producing such dispersions. In doing so, the present invention resolves at least some of the problems mentioned above.

SUMMARY OF THE INVENTION

The current invention provides for a method for producing an aqueous dispersion suitable for being used as a flame retardant additive to wood composite panels. Dispersions of flame retardant compositions typically suffer from the fact that they do not remain stable for a very long time. Hence, when dispersions are desired during the production process of wood composite panels, they are often produced on site at the production facility of the panel boards. This is a drawback for many manufacturers. By providing a system in which first a premix is produced, after which the premix is further treated by an inline rotor stator mixer, a very fine dispersion is obtained, which is stable for at least two days, or more. As such, the dispersion can be ready-made offered to customers which can immediately apply them in their panel production process. This is a huge advantage and cost effective.

In a second aspect, the current invention is equally directed to a stable dispersion.

DESCRIPTION OF FIGURES

FIG. 1 shows a production installation scheme, elucidating on an embodiment of the production installation employed in producing the aqueous dispersion according to an embodiment of the method.

DETAILED DESCRIPTION OF THE INVENTION

The present invention concerns a method for producing aqueous dispersions for use as a flame retardant additive to wood composite panels. The present invention also concerns an aqueous dispersion of this kind, for instance produced using said method.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention. As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "% by weight", here and throughout the description unless otherwise defined, refers to the relative weight of the respective component based on the overall weight of the formulation.

The expression "wood composite panels" refers to a range of derivative wood products which are manufactured by binding or fixing the strands, particles, fibers, or veneers or boards of wood, together with adhesives or resins, to form composite materials. Typically, engineered wood products are made from the same hardwoods and softwoods used to manufacture lumber. Sawmill scraps and other wood waste can be used for engineered wood composed of wood particles or fibers, but whole logs are usually used for veneers, such as plywood, MDF or particle board. Some engineered wood products, like oriented strand board (OSB), can use trees from the poplar family, a common but non-structural species.

Alternatively, it is also possible to manufacture similar engineered bamboo from bamboo; and similar engineered cellulosic products from other lignin-containing materials such as rye straw, wheat straw, rice straw, hemp stalks, kenaf stalks, or sugar cane residue, in which case they contain no actual wood but rather vegetable fibers.

Hence, wood composite panels may include, but are not limited to plywood, fibreboard, oriented strand board (OSB) laminated timber or veneer, particle board, panel board, or medium density fiber board.

The phrase "aqueous" as is used herein in connection with a composition of the invention means that the composition has been at least partially dissolved in a solvent such as water, or that a dispersion has been produced.

The term "dispersion" as used herein refer to an aqueous system in which particles are dispersed in a continuous phase of a different composition (or state), in the current case solid particles in a liquid.

The term "flame retardant agent" as used herein is to be understood as an agent which when added to a wood composite material, is able to provide fire retardancy characteristics to said material. Fire retardancy is defined by the reduction of release of energy, spread of flame and speed at which the flame spreads during a fire.

The term "smoke suppressing agent" is to be understood as an agent which, when added to a wood composite material, is able to reduce the smoke production or density of the material when heated or burning.

In a first aspect, the present invention discloses a method for producing an aqueous dispersion suitable for being used as a flame retardant additive to wood composite panels, said method comprising the steps of
providing in a disperser tank having a first, internal wet-milling system and being externally connected, via an outlet valve, to second, inline wet-milling system, when said outlet valve is closed, water and at least one flame retardant agent being in the form of granules and/or particles, and actuating the internal wet-milling system, thereby obtaining a premix,
subsequently opening the outlet valve and actuating the inline wet-milling system, and
adding to said premix at least one pH-regulator, at least one inorganic thickener, and optionally at least one smoke suppressing agent, while maintaining the actuation of both wet-milling systems until a dispersion is obtained.

"Wet-milling systems" generally encompass a broad class of systems that are capable of reducing particle sizes (and size distributions) of liquid-suspended particles and granules. More specifically for the present invention, said liquid is aqueous of nature. The working mechanism of such systems is based upon physically breaking down larger particles into smaller ones. Some wet-milling systems in particular, enable reducing particle sizes down to the micron or even the submicron range. Multiple types of wet-milling systems exist, comprising but not limited to: "tumbling wet-milling systems", "vibrating wet-milling systems", "stirred wet-milling systems", and any combination thereof.

"Tumbling wet-milling systems" make up a first type of wet-milling systems. Such systems comprise a vessel that can be set to rotate as a whole, about its axis. In case of the aforementioned internal wet-milling system, said vessel could be the disperser tank itself. In case of the aforementioned inline wet-milling system, said vessel is externally connected to said disperser tank, via the outlet valve. The vessel axis (also the axis of rotation) is thereby oriented substantially horizontally. Upon actuation, the vessel rotation speed is chosen such that the vessel content continuously tumbles, as a result of gravity. On the one hand, said content comprises an aqueous suspension comprising water and the particles/granules. On the other hand, this content is supplemented with the so-called "grinding media". Typically, their respective volume proportions are about 25% and 50% of the total internal vessel volume. Examples of grinding media are balls or rods; these are made from materials such as, but not limited to, silicon nitride and chrome steel. In their tumbling movement, said grinding media crush the particles, both in between them, and against the vessel wall. The particles are thereby subjected to normal forces, oblique forces and/or shearing forces, causing them to break. Alternatively, the larger granules themselves serve as grinding media, and there is no need for additional balls or rods. The vessel wall is usually reinforced. Optionally, the vessel wall is internally provided with so-called "liners", for instance but no limited to: "smooth liners", "Osborn liners", "El Oro liners" and/or "Forbes liners". Vessel rotation speeds for tumbling wet-mill systems should be situated somewhere between 5 rpm and 200 rpm. It is more convenient to define such rotation speeds in relation to the so-called "critical speed". Said critical speed is the rotation speed for which the grinding media cease to tumble in the rotating vessel: the centrifugal force acting on them starts to outweigh gravity. Typical rotation speeds lie between 50% and 85% of said critical speed.

"Vibrating wet-milling systems" make up a second type of wet-milling systems. These systems comprise a similar vessel, which is set to vibrate instead of rotate. Again, grinding media such as balls and rods crush the granules and particles that are fed to said vessel, causing them to break up.

"Stirred wet-milling systems" make up a third type of wet-milling systems. The system now again comprises a vessel, into which an aqueous suspension is brought or prepared. Said vessel is now not necessarily rotated or vibrated, yet it is internally provided with one or more, agitating devices. For instance, the vessel is internally provided with at least one rotation shaft, onto which one or more pins, discs, and/or a rotable stirrer work head are mounted. Said rotation shaft may be oriented horizontally, vertically or in any other direction. Such wet-milling systems can be used with or without grinding media.

On the one hand, if no grinding media are employed, particle size reduction is primarily due to the milling action of the agitating device itself. For instance, the rotation shaft drives one or more impellers, saw-toothed blades, and/or rotor/stator work heads. Alternatively, in case of an inline stirred wet-milling system, such impellers, saw-toothed blades and rotor/stator work heads can be provided into an outlet of the disperser tank.

On the other hand, in "stirred-ball wet-milling systems", the agitating device initiates the movement of the vessel content, whereby said content comprises ball-type grinding media. Particle size reduction is then primarily due to particle crushing, in between balls and/or between balls and the vessel wall. The grinding media (balls) may thereby be rather small, down to tens of microns. On the other hand, rotation speeds may be quite elevated, up to 20000 rpm or higher. Possibly, the agitating device itself also has a particle size reducing action.

An advantage of wet-milling, as opposed to dry grinding, is that it is possible to obtain a particle size distribution with a significant portion of submicron-sized particles. A reduced overall particle size results in an increased stability of the dispersion.

Another advantage of wet milling, as opposed to dry grinding, is that the fine particles are directly incorporated into an (aqueous) dispersion, whereby no dust is formed. The technique can therefore be a lot safer, because some types of dust give rise to health risk. Moreover, some types of dust, when mixed with environmental air or oxygen, feature an explosive behavior. Another advantage is that losses of material are significantly reduced, because fine particles cannot escape in the form of dust. Dosing of wet substances is also easier and hence more precise than dosing of dry substances, which is an additional advantage.

The present method is thus a two-step-method: in a first step, a uniform premix is prepared, the premix comprising water and at least one flame retardant agent, in the form of granules and/or particles. This premix is partly dispersed, yet it still contains relatively large particles and it is not stable. However, the premix is sufficiently homogeneous for being received by the inline wet-milling system, during the second step of the method. Thereby, the premix is further dispersed. Also during this second step, other agents such as at least one pH-regulator, at least one inorganic thickener, and optionally at least one smoke suppressing agent are added to the content of the disperser tank, while maintaining the actuation of both dispersers.

An advantage of employing the two-step-method above is that the flame retardant agent can be added in any form. For example, the flame retardant agent is added in the form of millimeter-sized prills. In the first step, the content of the disperser tank is transformed into a homogeneous premix, using the internal disperser. The particles and/or granules of the flame retardant agent are thereby disintegrated into both optically detectable solid particles and non-optically detectable solid particles.

Another advantage is that two different types of wet-milling systems can be synergistically combined. It is therefore possible to obtain an ultimate particle size distribution that is smaller.

Preferably, the inline wet-milling system is used in a loop configuration, whereby its outlet is connected to the disperser tank.

According to a further preferred embodiment of the method, said internal wet-milling system is a tumbling and/or stirred wet-milling system; the associated rotation speed upon actuation is between 5 rpm and 20000 rpm.

According to a further preferred embodiment of the method, said internal wet-milling system is an internal, stirred wet-milling system, such as an internal blade type or rotor/stator type disperser; the associated rotation speed upon actuation is between 500 rpm and 3600 rpm.

According to a non-limiting, alternative embodiment, the internal wet-milling system comprises at least one low speed scraper and/or one stirrer, actuated at a rotation speed between 50 and 6000 rpm. Said system advantageously increases the homogeneity of the premix, thereby avoiding phase separation. Even in case it engenders only a limited or insignificant reduction in particle size, such a scraper/stirrer (or scraper/stirrer assembly) is still conceived as a possible embodiment of the internal wet-milling system. According to a non-limiting, further embodiment, the flame retardant agent is micronized to form a powder, prior to it being fed to the disperser tank. For instance but not limited thereto, such a preceding micronization process comprises dry-grinding of the granules and/or particles. The internal wet-milling system then does not significantly affect the particle size distribution. In contrast, the inline wet-milling system further reduces said particle size distribution.

According to a further preferred embodiment of the method, said inline wet-milling system is a tumbling wet-milling system or a stirred wet-milling system; the associated rotation speed upon actuation is between 5 rpm and 20000 rpm.

According to a further preferred embodiment of the method, said inline wet-milling system is an inline, stirred wet-milling system, such as an inline rotor/stator type disperser; the associated rotation speed upon actuation is between 500 rpm and 3600 rpm.

According to a further preferred embodiment of the method, said method comprises the steps of:
  providing in a disperser tank having an internal blade type or rotor/stator type disperser and being externally connected, via an outlet valve, to an inline rotor/stator type disperser, when said outlet valve is closed, water and at least one flame retardant agent being in the form of granules and/or particles, and actuating the internal disperser at a rotation speed between 500 rpm and 3600 rpm, thereby obtaining a premix,
  subsequently opening the outlet valve and actuating the inline disperser, at a rotation speed between 500 rpm and 3600 rpm, and
  adding to said premix at least one pH-regulator, at least one inorganic thickener, and optionally at least one smoke suppressing agent, while maintaining the actuation of both dispersers until a dispersion is obtained.

In a preferred embodiment of the method, the internal disperser is a tank-mounted, blade-type disperser, comprising one or more blades on a blade shaft. These blades preferably have a saw tooth design. Even more preferably, the internal disperser comprises a vertical, tank-mounted blade shaft with a single, horizontally extending, saw toothed blade. The blade shaft is actuated at a rotation speed between 500 rpm and 3600 rpm, more preferably at a rotation speed between 1000 rpm and 2500 rpm, and even more preferably at a rotation speed of about 1500 rpm. The internal disperser thereby induces a moderate hydraulic shear, meaning that it induces moderate velocity gradients in the fluid, thereby moderately dispersing the content of the disperser tank. 'Moderate' should thereby be defined in relation to the particle distribution, as mentioned hereunder. In an alternative embodiment of the method, the internal disperser is a tank-mounted, rotor/stator type disperser, having a rotor/stator type work head as described hereunder.

In a further preferred embodiment of the method, the inline disperser is a rotor/stator type disperser, comprising a rotor/stator type work head. Said work head comprises a rotor with rotor blades and a perforated stator. The rotor can be set to rotate in a stator receptacle and/or along a stator plate, whereby the stator is provided with perforations. The stator is stationary, while the rotor is actuated at a rotation speed between 500 rpm and 3600 rpm, more preferably at a rotation speed between 2000 rpm and 3600 rpm, and even more preferably at a rotation speed of about 3000 rpm. A precise gap is provided between at least one component of the rotor and one component of the perforated the stator, such that a relative rotation of both components, in close proximity to each other, is enabled. Upon actuation of the rotor/stator inline disperser, the rotor blades of the rotor force the fluid through the perforations in the stator, resulting in a milling action with high velocity gradients. The inline disperser thus induces a high hydraulic shear in the fluid, thereby further dispersing the content of the disperser tank. The inline disperser is typically used in a loop configuration, whereby its outlet is connected to the disperser tank.

The present method is thus a two-step-method: in a first step, a uniform premix is prepared, the premix comprising water and at least one flame retardant agent, in the form of granules and/or particles. This premix is partly dispersed, yet it still contains relatively large particles and it is not stable. However, the premix is sufficiently homogeneous for being received by the inline rotor/stator disperser, during the second step of the method. Thereby, the premix is further dispersed. Also during this second step, other agents such as at least one pH-regulator, at least one inorganic thickener, and optionally at least one smoke suppressing agent are added to the content of the disperser tank, while maintaining the actuation of both dispersers.

An advantage of employing the two-step-method above is that the flame retardant agent can be added in any form. For example, the flame retardant agent is added in the form of millimeter-sized prills. In the first step, the content of the disperser tank is transformed into a homogeneous premix, using the internal disperser. The particles and/or granules of the flame retardant agent are thereby disintegrated into both optically detectable solid particles and non-optically detectable solid particles. As a result of the moderate hydraulic shear, the optically detectable particles thereby become sufficiently small for said premix to be fed to the inline rotor/stator disperser.

In this respect, a distinction should be made between a medium hydraulic shear, resulting in a moderate degree of dispersion and a high hydraulic shear, resulting in a high degree of dispersion.

According to a non-limiting embodiment, adjuvants are added to provide for improved stabilization of the obtained dispersion. Said adjuvants counteract particle agglomeration through steric stabilization and/or electrostatic stabilization.

The flame retardant used in the framework of the current invention is preferably chosen from the general group of phosphorus and phosphate based flame retardants, inorganic flame retardants, and/or nitrogen based flame retardants.

Said phosphorus and phosphate based flame retardants cover a wide range of inorganic and organic compounds and include both reactive products which are chemically bound into the polymer material as well as additive products which are integrated into the material by physical mixing only. An example of such a flame retardants is ammonium dihydrogen phosphate or ammonium polyphosphate.

Said most commonly used inorganic flame retardants are hydroxides or aluminum and magnesium and zinc compounds.

Nitrogen based flame retardants are believed to act by several mechanisms (i.e. salts with organic or inorganic acids such as boric acid or cyanuric acid). Three chemical groups can be distinguished: pure melamine, melamine derivatives, i.e. salts with organic or inorganic acids such as boric acid, cyanuric acid, phosphoric acid or pyro/polyphosphoric acid, and melamine homologues such as melam, melem and melon, the latter finding only experimental use at this stage.

By preference, the amount of flame retardant in the dispersion is between 25% and 70% by weight, more preferably between 25% and 48% by weight.

The pH of the final dispersion will be adjusted in view of the use of in wood composite panels. It was found that by regulating the pH of the composition to a narrow and predefined range by use of pH regulating compound, an optimal compatibility with the resins used during the production of the wood composite panels is obtained. By preference, the pH of a 10% aqueous dilution of said dispersion will be between 5 and 7.

To that purpose, one or more pH regulators will be added during the preparation of the dispersion. These regulators are known in the art.

The dispersion may, next to a flame retardant compound, equally comprise a smoke suppressing agent. These agents will have an impact on the development of smoke and the density thereof in case of fire. Various smoke suppressors are known in the art, such as for instance boric acid or disodium octroborate (DOT).

The smoke suppressing agent is preferably present at a concentration of between 0.2% and 10% by weight, more preferably at a concentration between 0.5% and 7.5% by weight, more preferably at a concentration between 0.5% and 7.0% by weight.

A thickener or viscosity regulator is added to adjust the viscosity of the dispersion to a predefined viscosity target. While most dispersions in the art use the stronger organic thickeners because the particle size of the dispersions is too large, the very fine particle size of the dispersion according to the current invention allows the use of inorganic thickeners such as, but not limiting to clay thickeners such as bentonite or sepiolite thickeners.

Addition of these compounds prevents settlement of particles in dispersions according to the current invention, hence aiding to prolong the shelf life of the compositions.

By preference, said inorganic thickener is added in such proportions as to set the viscosity of the dispersion between 50 cP and 500 cP, more preferably between 50 and 200 cP. The thickener may be preferably added in a concentration of between 0.01 and 10% of the dispersion, more preferably between 0.01% and 5% by weight, more preferably between 1% and 5% by weight.

An advantage of the dispersion having a relatively low viscosity value, ranging from 50 cps to 200 cps, is that dosing can be performed much more precisely. Reducing the viscosity value of the dispersion, while at the same time maintaining or even improving the stability of the dispersion, is possible because of the very fine particle size distribution. Preferably, the obtained dispersion is stable for at least two days, more preferably at least three days, even more preferably at least 4, 5, or 6 days.

The total water content of the dispersion is preferably between 30% and 60% by weight, more preferably between 30% and 55% by weight, more preferably between 30% and 55% by weight, and more preferably between 40% and 55% by weight. The water is added during the formation of the premix, and the temperature is preferably maximally 35° C., more preferably between 15 and 35° C. In practice method of production of the second aspect of the present invention is preferably carried out at room temperature. Such moderate temperatures allow production without a need for a heating or cooling step.

In a non-limiting embodiment of the method, a defoamer may be included in the premix or added to the premix. Preferably, this is a non-silicon based defoamer, suitable for defoaming aqueous systems.

In a final step of the methodology of the current invention, the dispersion will be sieved, preferably by using a 400 μm sieve, thereby eliminating residual large compounds which may still be present in the dispersion. This ensures again the fine particle size of the current dispersion and a very homogenous dispersion.

In a second aspect, the current invention equally relates to an aqueous dispersion suitable for being used as a flame retardant additive to wood composite panels, which is stable for at least two days, more preferably at least three days, even more preferably at least 4, 5 or 6 days. This ensures that the dispersion can be ready-made delivered to production sites of wood composite panels.

The dispersion is preferably a 50% dispersion, which means that 50% of the dispersion will be solids in an aqueous system. Due to the formation of a premix and subsequent in line further mixing with a rotor stator, a very fine dispersion is obtained.

The viscosity of the dispersion is preferably between 50 and 500 cP, more preferably between 50 and 200 cP. The pH of the dispersion will preferably be between 3.5 and 7.5. In one embodiment, said pH of the dispersion is set to 5.9 and 6.1. In another embodiment, said pH is set to 6.9 and 7.1.

Said water content is preferably between 30% and 60% by weight, pH regulator is present between 2% and 25% by weight, said flame retardant is between 25% and 48% by weight, and the smoke suppressing agent is between 0.2% and 10% by weight, more preferably between 0.5 and 7.5%.

The dispersion is particularly useful to be produce wood composite panels with flame retardant and/or smoke suppressing activity, especially for use in medium-density fiberboard (MDF), oriented strandboard (OSB), panel board or particle board.

The aspects of the current invention will further be elucidated by means of examples and FIGURES, without being limited to these examples or FIGURES.

FIG. 1 shows a production installation 1 scheme, elucidating on an embodiment of the production installation 1 employed in producing the aqueous dispersion according to an embodiment of the method.

The production installation 1 comprises a disperser tank 2 with an internal volume of about 20 m³. The disperser tank 2 is internally provided with an internal disperser 3. Said internal disperser 3 comprises a vertical, tank-mounted blade shaft 4 that is connected to an internal disperser motor 5 and that is provided with a single, horizontally extending, saw toothed blade 6. The disperser tank 2 is externally connected to an inline disperser 7, via an outlet valve 8. This inline disperser 7 is used in a looped configuration, whereby its outlet is again connected to the disperser tank 2. The inline disperser 7 comprises a rotor/stator work head 9.

About 2200 kg of water 10 at ambient temperature, preferably at a temperature of about 20° C., is brought into the disperser tank 2 via the water supply 11. At this stage, the outlet valve 8 of the disperser tank 2 is closed, and none of the dispersers is actuated. For instance, said water supply 11 is governed using the water supply control 12 that is at least in communication with two level sensors 13. The internal disperser motor 5 is actuated such that the blade shaft 4 is set to rotate at a rotation speed of about 1500 rpm. After this, about 1700 kg of a flame retardant agent 14, in the form of millimeter-sized prills, is brought into the disperser tank 2 via the loss in weight feeder 15, which is actuated by the loss in weight feeder motor 16. Using the internal disperser 2, the heterogeneous mixture of water and the flame retardant agent is turned into a more uniform premix. The preparation of said premix, starting from the heterogeneous mixture of water and the flame retardant agent, takes about 15 minutes, depending on the type of flame retardant agent 14 employed.

In a second step, the outlet valve 7 is opened and the inline disperser 9 is actuated, at a rotation speed of about 3000 rpm. This way, the flame retardant agent 14 particles are further dispersed using both the internal disperser 3 and the inline disperser 7. In the meantime, other agents are subsequently added to the content of the disperser tank 2. These other agents include at least one pH-regulator, at least one inorganic thickener, and optionally at least one smoke suppressing agent. A stable, aqueous dispersion 17 is thus obtained, suitable for being used as a flame retardant additive to wood composite panels. According to the present embodiment, this stable dispersion 17 is directly extracted from the disperser tank 2 via the outlet valve 8, the outlet valve 8 being a three-way valve. In an alternative embodiment, such three-way valve can be provided along the return pipe of the inline disperser 7. In the end, the stable dispersion 17 is sieved using a 400 μm control sieve.

Features relating to the FIGURES:
1. production installation
2. disperser tank
3. internal disperser
4. blade shaft
5. internal disperser motor
6. saw toothed blade
7. inline disperser
8. outlet valve
9. rotor/stator work head
10. water
11. water supply
12. water supply control
13. level sensor
14. flame retardant agent
15. loss in weight feeder
16. loss in weight feeder motor
17. stable dispersion

The invention claimed is:
1. A method for producing an aqueous dispersion suitable for being used as a flame retardant additive to wood composite panels, said method comprising the steps of:
  providing water and at least one flame retardant agent in the form of granules and/or particles in a disperser tank when an outlet valve is closed, wherein the disperser tank has a first, internal wet-milling system and is externally connected via the outlet valve to a second, inline wet-milling system, actuating the internal wet-milling system, thereby obtaining a premix, subsequently opening the outlet valve and actuating the inline wet-milling system, and adding to said premix at least one pH-regulator, at least one inorganic thickener, and optionally at least one smoke suppressing agent, while maintaining the actuation of the internal wet-milling system and the inline wet-milling system until a dispersion is obtained.

2. The method according to claim 1, wherein said internal wet-milling system is a tumbling and/or stirred wet-milling system; and wherein an associated rotation speed upon actuation is between 5 rpm and 20000 rpm.

3. The method according to claim 2, wherein said internal wet-milling system is an internal blade type or rotor/stator type disperser; and wherein the associated rotation speed upon actuation is between 500 rpm and 3600 rpm.

4. The method according to claim 1, wherein said inline wet-milling system is a tumbling wet-milling system or a stirred wet-milling system; and wherein the associated rotation speed upon actuation is between 5 rpm and 20000 rpm.

5. The method according to claim 4, wherein said inline wet-milling system is an inline rotor/stator type disperser; and wherein the associated rotation speed upon actuation is between 500 rpm and 3600 rpm.

6. The method according to claim 1, wherein a pH of said obtained dispersion, in a 10% water dilution, is between 5 and 7.

7. The method according to claim 1, wherein a flame retardant concentration in the dispersion is between 25% and 48% by weight.

8. The method according to claim 1, wherein a temperature of said water for said premix is maximally 35° C.

9. The method according to claim 1, wherein said flame retardant agent is ammonium phosphate or ammonium dihydrogen phosphate.

10. The method according to claim 1, wherein the dispersion comprises the smoke suppressing agent at a concentration of between 0.5% and 7.5% by weight.

11. The method according to claim 1, wherein a total water content in the dispersion is between 30% and 55% by weight.

12. The method according to claim 1, wherein said inorganic thickener is added in such proportions as to set a viscosity of the dispersion between 50 cP and 200 cP.

13. The method according to claim 1, further comprising sieving the dispersion.

* * * * *